April 13, 1937. V. BENDIX 2,076,538
BRAKE
Original Filed July 14, 1924 2 Sheets-Sheet 1
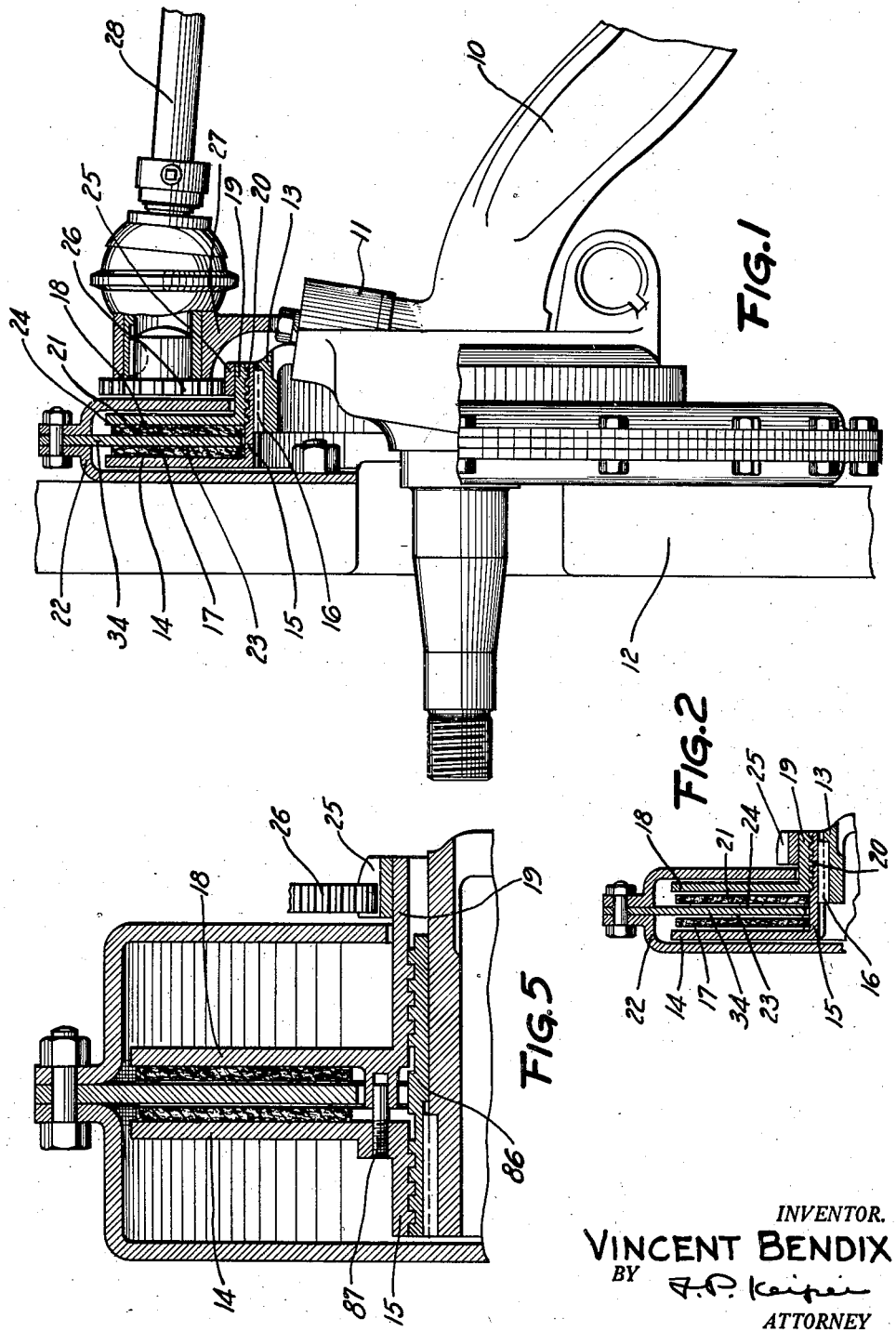
INVENTOR.
VINCENT BENDIX
BY
ATTORNEY

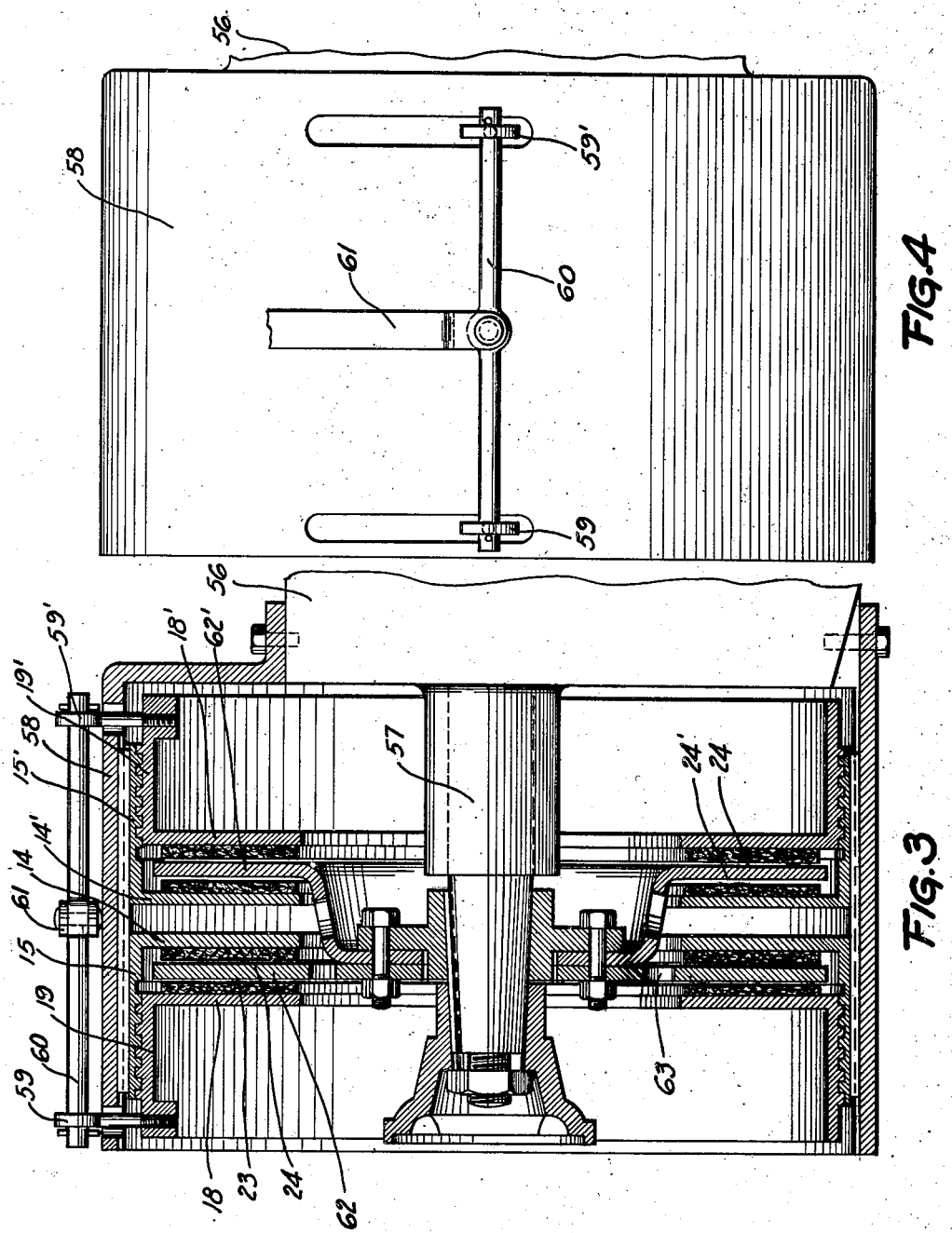

Patented Apr. 13, 1937

2,076,538

UNITED STATES PATENT OFFICE 2,076,538

BRAKE

Vincent Bendix, South Bend, Ind.

Original application July 14, 1924, Serial No. 726,050. Divided and this application January 21, 1933, Serial No. 652,961

17 Claims. (Cl. 188—72)

This invention has to do with brakes such as are particularly adaptable to road vehicles for the purpose of braking the movement of the wheels or other rotatable parts.

The brakes heretofore proposed for such adaptation have consisted, in most instances, of a cylindrical drum mounted for rotation with the wheel, and one or more braking elements mounted for movement radially of the wheel into frictional engagement with the inner or outer periphery of the drum. Numerous refinements of substantial merit have been made in the construction, arrangement and manner of operation of such brakes, as exemplified for instance in the well known Perrot brake wherein the initial coaction of the braking elements tends in itself to effect the complete coaction, but in all such brakes the braking surface available is obviously only that of the periphery of the drum, and due to the increasingly heavy traffic of road vehicles, the braking stresses which must be applied abruptly upon occasion are rapidly becoming too severe to be thus restricted in their area of application.

The principal objects of the invention are to provide an improved brake wherein the braking stresses are uniformly distributed over a relatively large braking surface, wherein the actuating stresses are neutralized within the assembly and axial thrust is thereby eliminated, wherein self-energization is had in that the initial coaction of the braking elements tends in itself to effect the complete coaction, and wherein the coactable braking elements are in the form of annular friction surfaces which are arranged to engage upon movement of certain of the same axially of the assembly.

While the foregoing statement is indicative in a general way of the nature of the invention, other objects and advantages not specifically referred to herein will be evident upon a full comprehension of the simple construction, compact arrangement and efficient manner of operation of the brake as set forth in the following description and accompanying drawings, wherein is presented several preferred embodiments of the invention.

It will be understood that such embodiments are chosen primarily for the purpose of exemplification, and are not intended to restrict the spirit of the invention short of its scope as defined by the appended claims.

In the drawings:

Figure 1 is a partially sectioned side elevation of one form of the invention;

Figure 2 is a fragmentary section corresponding to the sectioned portion of Figure 1;

Figure 3 is a diametric section through another form of the invention, as applied to the transmission of a vehicles;

Figure 4 is a top view of Figure 3; and

Figure 5 is a fragmentary sectional view through another related form of the invention.

Reference will first be made to that form of the invention illustrated in Figures 1 and 2, wherein the brake is presented in association with a conventional front wheel assembly consisting of an axle 10, a spindle 11 pivoted on the axle, and a wheel 12 journalled on the spindle.

The brake includes a cylindrical mounting bracket 13 which is carried by the spindle 11, an annular disk 14 having an inner peripheral flange 15 which is sleeved over the bracket 13 and is splined thereto by a suitable key 16 for movement on the bracket axially of the assembly, an annular friction mat 17 floatingly arranged adjacent the face of the disk 14 upon the flange 15 an annular disk 18 having an inner peripheral flange 19, which is sleeved over the flange 15 and is engaged therewith by interfitting spiral threads 20 of rather abrupt pitch arranged to permit convergent movement of the disk 18 spirally of the disk 14 in the general direction of rotation of the wheel 12, a second annular friction mat 21 floatingly arranged adjacent the face of the disk 18 upon the flange 15, a casing 22 which is carried by the wheel 12 and encompasses the disks 14 and 18 and which carries an annular disk like web 34 located between the two friction mats and the disks 14 and 18, which web 34 forms a pair of friction surfaces 23 and 24 for the friction mats upon convergent movement of the disks 14 and 18, and operating means for effecting convergent movement of the disks 14 and 18 into frictional engagement with the web or brake disk 34 secured in the casing 22. The operating means mentioned includes a short arcuate rack 25 which is secured to the outer periphery of the flange 19 exteriorly of the casing 22, a pinion 26 which is meshed with the rack 25 and is journalled in a support 27 carried by either the spindle 11 or the bracket 13, a universally mounted rod 28 which is supported at one end on a chassis not shown, for operating the pinion 26 and rack 25 and thereby effect the desired relative movement of the disks 14 and 18 axially of the assembly. For convenience in assembling or disassembling the brake, the casing 22 may be formed in two axially separable parts, as shown.

When the brake is applied, the disks 14 and 18 will move into frictional engagement with the web 34 of the rotating casing 22 through the intermediation of the friction mats 17 and 21; the disk 14 moving axially of the assembly, and the disk 18 moving spirally of the axis of the assembly in the general direction of rotation of the casing 22. When the friction mat 21 on the disk 18 initially contacts with the friction surface 24 of the web 34 the frictional engagement set up by such contact will tend to continue the spiral movement of the disk 18, and will accordingly tend to effect completely the requisite frictional engagement of both of the friction mats 17 and 21 with both of the friction surfaces 23 and 24 on either side of the web respectively, through an obvious self-energizing action. The stresses acting on the disks axially of the assembly to effect and maintain the frictional engagement are equal in opposite directions, and are neutralized within the assembly by the floating characteristic of the mounting of the disks, which characteristic also insures a uniform distribution of the braking stresses throughout all of the several friction surfaces of the brake.

In this construction the friction mats 17 and 21 may or may not be secured to the disks 14 and 18, but may float freely alongside the same when the brake is not in operation. This arrangement of the mats, which is equally applicable to any of the forms of the invention, permits both faces of the friction mats to be used to advantage in effecting the frictional engagement between the disks 14 and 18 and the web 34.

Reference will now be had to that form of the invention illustrated in Figures 3 and 4, which is similar to that shown in Figures 1 and 2 since a single annular disk is adapted to be gripped by convergently moved friction mats. As shown, the brake is in association with a conventional transmission assembly consisting of a transmission casing 56 and a power transmitting shaft 57.

In this form of the invention the transmission casing 56 may carry a drum 58 which is the equivalent of the bracket 13 previously described in the other forms, and has keyed thereto the flanges 15 15' of the disks 14 14'. It will be noted in this form of the invention that a double unit brake is employed, although it will be obvious that any of the single brake units herein described may be used for the same purpose. The flanges 19 19' of the disks 18 18' are threaded on the flanges 15 15', and are rotated simultaneously to operate the brake by means of projections 59 59' on the flanges 19 19', which flanges may project through elongated apertures in the drum 58. In order to equalize the operation of the two brake units, a cross link 60 is connected with the projections 59 59', and is in turn connected at its center with an equalizing pull rod 61. The power transmitting shaft 57 of the transmission is provided with two spaced disks 62 and 62'. The disks 62 and 62', which are the equivalents of the casing 22 in the previously described forms, present on their opposite faces the friction surfaces 23 and 24 and 23' and 24'. By spacing the disks 62 and 62' away from each other in the manner shown, and by aperturing the disks as at 63, the heat produced in the operation of the brake will be rapidly dissipated.

It will be appreciated that the form shown in Figures 1 and 2 of the invention is equally applicable to a transmission, and that the brake may be constructed on a small diameter to accommodate itself to the limited space available for the same at the rear end of the transmission below the floor boards.

In Figure 5, which is similar to the structure of Figures 1 and 2, the disks 14 and 18 are both moved by spiral threads in opposite directions axially of the assembly, but the disks instead of having a screw-threaded interconnection with one disk splined upon the bracket as shown in Figure 1, the disks 14 and 18 have screw-threaded connections with a common sleeve 86, which is freely movable axially of the assembly and serves to neutralize all axial thrust. The flange 19 of the disk 18 is moved by the rack 25 and pinion 26 arrangement previously described, and such movement is translated to the flange 15 of the disk 14 by a loose stud connection 87 between the flanges of the disks.

In each of the several forms of the invention, it will be recognized that a non-rotatable part is present in the bracket 13 of the spindle, or in the drum 58 of the transmission casing, or in any equivalent structure; that a plurality of braking elements associated with such non-rotatable part are present in the friction surfaces of the disks 14 and 18 or of the mats associated with the disks; that a rotatable part is present in the casing 22, and web 34 or the disks 62 and 62'; and that a plurality of braking elements associated with such rotatable part are present in the friction surfaces of the web of the casing 22 or the disks 62 and 62'.

This application is a division of my copending application Serial No. 726,050 of 1915 filed July 14, 1924.

What is claimed is:

1. A brake comprising a brake disc rotatable in a fixed plane and having a braking surface on either side thereof, a pair of friction discs adapted to engage the opposite sides of said rotatable disc, a support for said friction discs, splined means permitting axial bodily movement of said friction discs, and operating means including helical threads for converging said friction discs into engagement with said rotatable disc.

2. A brake comprising a support, a cylindrical sleeve splined thereon for axial movement, a pair of friction discs threaded on said sleeve and secured against relative rotation, so that rotation of said friction discs in unison upon said sleeve will cause the same to converge or separate, and a brake disc, rotatable in a fixed plane about the axis of said sleeve interposed between said pair of friction discs.

3. A brake comprising a support, a sleeve splined for axial movement thereon, right and left hand helixes on said sleeve, a pair of friction discs threaded one on said right hand helix and the other on said left hand helix, means fixing said friction discs against relative rotation but permitting relative axial movement, and means for rotating one of said friction discs.

4. A brake comprising a support, a sleeve arranged thereon, means for restraining said sleeve against rotational movement but permitting axial movement, a pair of friction discs mounted upon said sleeve, means for preventing relative rotation between said friction discs but permitting relative axial movement, and means on said friction discs and said sleeve whereby relative rotation in one direction of said friction discs relative to said sleeve will produce converging movement.

5. In a brake, a sleeve splined against rotary movement, differential threads on said sleeve, a pair of friction discs engaging said differential threads, a socket in one friction disc and a pin secured to the other friction disc extending into said socket whereby relative rotation between said friction discs is prevented but permitting relative axial movement therebetween.

6. A brake comprising a cylindrical housing, a friction disc having an outer peripheral sleeve splined on the inside of said housing for axial movement only relative thereto, a second friction disc having an outer peripheral sleeve exteriorly threaded and engaging interior threads upon the sleeve of said first named friction disc, a brake disc rotatable in a fixed plane between said friction discs, and means for rotating said second named friction disc to converge said friction discs into brake engagement.

7. A brake comprising a cylindrical housing, a pair of spaced rotary brake discs, two pairs of friction discs arranged on about each brake disc, each pair comprising one friction disc splined for axial movement within said cylindrical housing, and the other friction disc threadedly engaging the first friction disc, whereby relative rotation between the discs of each pair produce frictional engagement between the pair of friction discs and a brake disc, and means for simultaneously rotating the rotatable friction disc of each pair.

8. A brake comprising a cylindrical housing, a plurality of friction discs splined on the inside of said housing for axial movement, a plurality of friction discs threadedly engaging said splined friction discs, a plurality of rotatable brake discs arranged between pairs consisting of a splined friction disc and friction disc threaded thereon, and means for rotating each of the threaded friction discs to bring all of the friction discs into frictional engagement with said brake discs.

9. A brake comprising a support, a friction disc having a sleeve splined on said support, an external helical thread on said sleeve, a second friction disc threaded on said sleeve, and a rotatable brake disc adapted for rotation in a fixed plane located between said friction discs.

10. A brake comprising a support, a friction disc having a sleeve splined on said support, an external helical thread on said sleeve, a second friction disc having a sleeve with an internal helical thread in engagement with said external thread, a brake disc adapted to rotate in a fixed plane between said friction discs, and means for rotating said second friction disc for actuating the brake.

11. A brake comprising a support, a rotatable part, a friction disc having a sleeve splined on said support, a second friction disc threadedly engaging said sleeve, means to rotate said second disc, a brake disc located between said friction discs, and a housing member securing said brake disc to said rotatable part, and constraining the same to rotate in a fixed plane.

12. A brake comprising a rotating disc, friction means adapted to engage the outer annular faces of said disc, an annular offset in the disc towards the center thereof, and an aperture in said offset portion between the outer surface and the center of said disc to permit the flow of cooling air from one side of said disc to the other.

13. A brake comprising a brake disc rotatable in a fixed plane and having a braking surface on either side thereof, friction means including a pair of friction discs adapted to engage the opposite sides of said rotatable brake disc, a support for said friction means, said support having splined engagement with said friction means to permit axial floating thereof, and operating means including helical threads for converging said friction discs into engagement with said brake disc.

14. The combination with a rotor having a disk portion, of a member freely movable in a direction transverse to the plane of the disk, a pair of brake shoes carried by said member upon opposite sides of the disk, and means operatively connected to one only of the shoes for moving said shoe toward the other to apply both brake shoes.

15. The combination with a rotor having a disk portion, of a member freely movable transversely to the plane of the disk, a pair of brake shoes carried by said member upon opposite sides of the disk, and means directly connected with one only of said shoes for moving said shoe toward the other to adjust the normal spacing of the shoes.

16. The combination with a disk-shaped rotor of a member having a portion freely movable transversely to the plane of the rotor, a pair of brake shoes carried by said member adjacent opposite faces of the rotor, means for effecting relative movement of said shoes toward and from the opposite faces of the rotor, said member permitting limited transverse floating movement of the two brake shoes as a unit relatively to said disk to permit equal gripping action against opposite faces of said rotor.

17. The combination with a rotor having a disk portion, of a member freely movable transversely to the plane of the disk, a pair of brake shoes carried by said member adjacent opposite faces of the disk, means for moving one of said shoes relative to the other to vary the normal spacing between the shoes, and for moving the other shoe toward the first mentioned shoe to grip the disk between said shoes.

VINCENT BENDIX.